Sept. 3, 1929.  F. J. ANDEL  1,726,532
WHEEL REMOVER
Filed Dec. 7, 1927
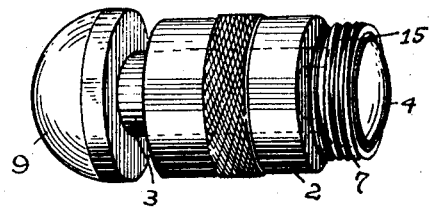
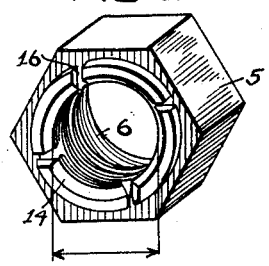
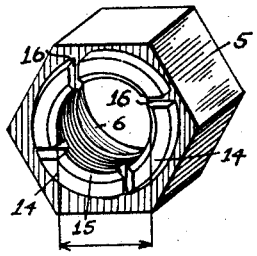
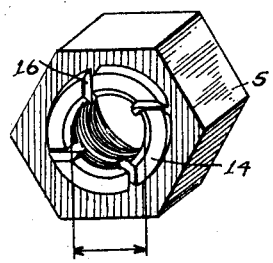
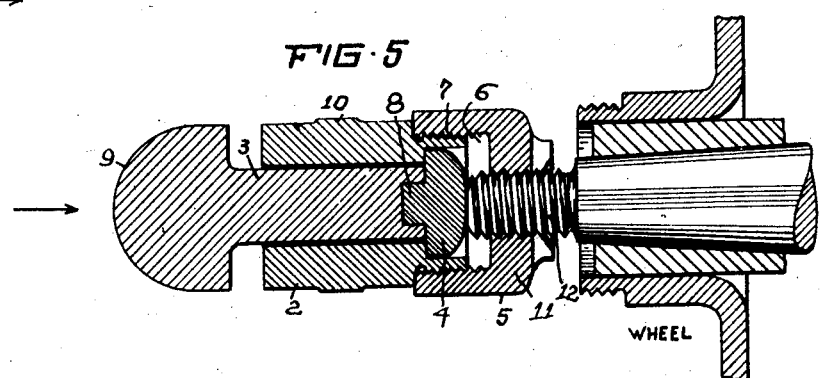
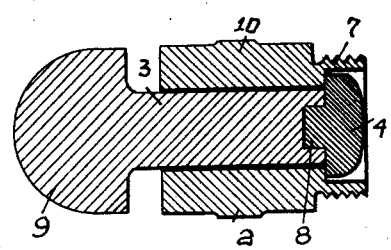
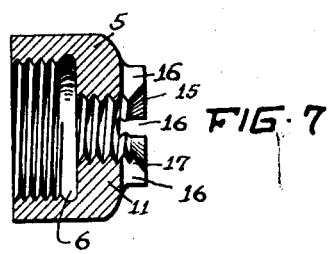
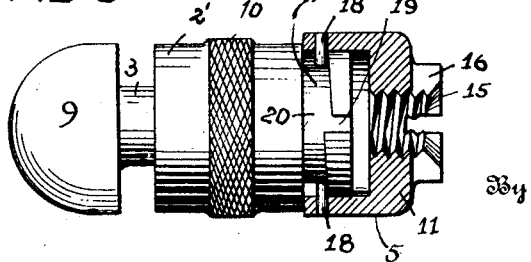
Inventor
F. J. ANDEL
By Fisher, Moser & Moore
Attorney Patented Sept. 3, 1929.

1,726,532

UNITED STATES PATENT OFFICE.

FRANK J. ANDEL, OF CLEVELAND, OHIO.

WHEEL REMOVER.

Application filed December 7, 1927. Serial No. 238,278.

The present invention pertains to wheel removers, the device being particularly constructed to permit its convenient attachment to the threaded spindle of a vehicle wheel axle and to permit a sudden blow or shock to be given axially to the axle or jar the wheel loose without endangering the screw-threads on the spindle. Thus, the present device is constructed to effect trimming of the screw-threads on the spindle if mutilated by previous hammering operations. In that connection it is a common practice for garage mechanics to remove the nut from the axle and then hammer the screw-threaded end of the spindle to jolt the wheel loose, thus upsetting and marring the end of the screw-threaded spindle and its lead thread: Also owing to the many different makes of automobiles in use, there is considerable variation in the diameter of the screw-threaded extremities of the wheel spindles, making it necessary heretofore to provide a separate wheel remover for each size of spindle. The present wheel remover is constructed or made of screw-connected sections which may be readily separated and one section quickly replaced by another similar element having a screw-connecting and thread chasing formation of another size so that any desired size of axle spindle may be operated upon, using the same main body of the tool in each instance to transmit the hammer blows without affecting or injuring the screw-threads which connect the sections together or the screw-threads which secure the device to the axle spindle. The sectional form of the device also permits the use of a relatively larger and heavy hammering plunger in the organization or aggroupment or parts, or one of such ample proportions and strength as will withstand the hammering of all the sizes of axle spindles to which the device may be connected.

In the accompanying drawings, Fig. 1 is a perspective view of the main section containing the plunger, and Figs. 2, 3, and 4 are perspective views of three connecting sections having different bores to permit the main section or plunger holding body to be used with the same number of spindles of corresponding diameters. Fig. 5 is a sectional view of the device affixed to a screw-threaded spindle as in wheel removing operations. Fig. 6 is a sectional view of the main section containing the plunger, and Fig. 7 a sectional view of the detachable and interchangeable section or member which is used as a connector and screw-thread chaser. Fig. 8 is an elevation and sectional view of a modification.

The device is made in four parts or pieces, namely, a cylindrical body section 2, a plunger 3 loosely confined within body 2, a button or cap 4 for securing the body and plunger together, and a hexagonal member or interchangeable section 5 having a screw-threaded recess 6 in one end adapted to receive and connect with the reduced screw-threaded extension 7 of body 2. This extension is also recessed to confine the button 4 which has a short stem 8 wedged tightly in a shallow bore in the smaller end of plunger 3. The outer end of the plunger has a rounded enlargement or head 9 which may be hit centrally with a hammer to shift the plunger axially within body 2, the head being spaced apart from the outer end of the body to permit such relative movement therebetween. The middle portion 10 of body 2 may be knurled or provided with any suitable formation to permit the body to be gripped and held in the hand, especially when the end section or connector member 5 is screwed thereto. Recess 6 at one end of member 5 or the recess in the end of the plunger is of sufficient depth to permit the button or cap 4 to move axially therein, and the end wall 11 of member 5 is bored and screw-threaded axially thereof to fit and screw-connect with a given sized axle spindle 12, see Fig. 5. A short boss or projection 14 on the outer face of wall 11 has a flaring opening 15 which converges and meets with the outer end of the screw-threaded bore in member 5, and a series of slots 16 divide the annular boss or projecting portion 14, including the first and second screw-threads 17 at the base of the flaring entrance 15, see Fig. 7. This entrance therefore serves as a guide in attaching the tool to a screw-threaded spindle and in the event that the leading screw-thread on the spindle is battered, stripped or of irregular form the cutting edges of the slotted threads 17 at the base of entrance 15 will chase or finish the mutilated thread on the spindle, thereby permitting the screw-connecting member 5 to be readily attached to the spindle until the end of the spindle contacts with or nearly engages the cap or button on the inner end of the plunger. In making the screw-connection of hexagonal member 5 with the axle spindle a wrench may be used if the thread on the spindle is mutilated or a tight fit is encountered. The screw-threaded connecting members 5 are made separate and detachable from body 2 to permit nine or ten different sizes to be used interchangeably for the various makes of automobiles on the market. To accommodate a wide range of different diameters of spindles the body and plunger part of the tool is therefore made proportionately heavy and large to withstand the hammering on the largest size of spindle for which the set is intended to be used with. Consequently, all the smaller sizes are adequately handled without injury to the tool itself in hammering operations. In Fig. 8 I show a cylindrical body member 2' having a bayonet lock or quick detachable connection for the interchangeable connector member 3. the extremity 7' of the body member being channeled and slotted instead of being screw-threaded, and the connector member 5' having pins 18 to enter the slots 19 and lock in the annular channel 20.

What I claim, is:

1. A wheel remover, comprising a cylindrical body having a central bore and a screw-threaded extension, a recessed member screw-connected to said extension having a screw-threaded bore axially in line with the bore in said body, and a plunger movably confined in said body bore having a cap confined within said recessed member.

2. A wheel remover, comprising a cylindrical body having a reduced extension which is screw-threaded and recessed, a plunger extending through said body having an enlargement at its outer end and a cap at its inner end confined within said recessed extension, and an interchangeable connector member detachably affixed to said body extension having a screw-threaded opening centrally in line with said plunger.

3. A wheel remover, comprising a body, an interchangeable member detachably affixed to one end of said body containing a screw-threaded opening formed with a screw-thread cutting entrance, and a plunger loosely confined within said body and extending outwardly through one end thereof, and its inner end having an enlargement confined between said body and member opposite said screw-threaded opening.

4. A wheel remover, comprising a cylindrical body having a central bore, a plunger extending through said bore having a head on its outer end, means for limiting the movement of said plunger outwardly in the bore, and a hexagonal member having means for connecting it detachably to said body, said member being formed with a central screw-threaded opening having a flaring entrance and screw-thread cutting means at the base of said entrance.

In testimony whereof I affix my signature.

FRANK J. ANDEL.